(12) United States Patent
Dwivedi et al.

(10) Patent No.: US 11,531,875 B2
(45) Date of Patent: Dec. 20, 2022

(54) SYSTEMS AND METHODS FOR GENERATING DATASETS FOR MODEL RETRAINING

(71) Applicant: Nasdaq, Inc., New York, NY (US)

(72) Inventors: Anand Dwivedi, Boston, MA (US); Hyunsoo Jeong, Boston, MA (US)

(73) Assignee: NASDAQ, INC., New York, NY (US)

(*) Notice: Subject to any disclaimer, the term of this patent is extended or adjusted under 35 U.S.C. 154(b) by 408 days.

(21) Appl. No.: 15/931,369

(22) Filed: May 13, 2020

(65) Prior Publication Data

US 2020/0364551 A1   Nov. 19, 2020

Related U.S. Application Data

(60) Provisional application No. 62/847,621, filed on May 14, 2019.

(51) Int. Cl.
*G06N 3/08* (2006.01)
*G06N 3/04* (2006.01)

(52) U.S. Cl.
CPC ............. *G06N 3/08* (2013.01); *G06N 3/0454* (2013.01)

(58) Field of Classification Search
CPC .............................. G06N 3/08; G06N 3/0454
See application file for complete search history.

(56) References Cited

U.S. PATENT DOCUMENTS

| | | | |
|---|---|---|---|
| 8,374,974 B2 | 2/2013 | Chen et al. | |
| 10,460,235 B1 * | 10/2019 | Truong | G06F 40/20 |
| 2003/0018652 A1 | 1/2003 | Heckerman et al. | |
| 2004/0204975 A1 | 10/2004 | Witting | |
| 2007/0244741 A1 | 10/2007 | Blume et al. | |
| 2011/0178847 A1 | 7/2011 | Rane et al. | |
| 2011/0231305 A1 | 9/2011 | Winters | |
| 2017/0372155 A1 | 12/2017 | Odry et al. | |
| 2018/0189677 A1 | 7/2018 | Anderson et al. | |
| 2020/0312457 A1 * | 10/2020 | Kasthurirathne | G06N 3/0472 |
| 2020/0356839 A1 * | 11/2020 | Tocornal | G06V 10/80 |

FOREIGN PATENT DOCUMENTS

| | | |
|---|---|---|
| WO | 2017/055878 | 4/2017 |
| WO | 2017/223560 | 12/2017 |

OTHER PUBLICATIONS

International Search Report and Written Opinion for International Application No. PCT/US2020/032780, 16 pages, dated Jul. 27, 2020.
International Search Report and Written Opinion for International Application No. PCT/US2019/038916, 15 pages, dated Sep. 13, 2019.
U.S. Appl. No. 62/689,545, filed Jun. 25, 2018.
U.S. Appl. No. 16/451,607, filed Jun. 25, 2019.

* cited by examiner

*Primary Examiner* — David Bilodeau
(74) *Attorney, Agent, or Firm* — Nixon & Vanderhye P.C.

(57) ABSTRACT

A computer system is provided and programmed to assemble a plurality of synthetic datasets and blend those synthetic datasets into a synthesized dataset. An evaluation is then performed to determine whether an existing model should be associated with the synthesized dataset or a new model should be trained from an existing model using the synthesized dataset.

20 Claims, 12 Drawing Sheets

SYSTEMS AND METHODS FOR GENERATING DATASETS FOR MODEL RETRAINING

CROSS REFERENCE(S) TO RELATED APPLICATION(S)

This application claims priority to U.S. Application No. 62/847,621, filed May 14, 2019, the entire contents of which are hereby incorporated by reference.

TECHNICAL OVERVIEW

The technology described herein relates to processing and/or preparing datasets used to retrain or train models. More particularly, the technology described herein relates to transfer learning techniques for machine learning and more particularly deep learning.

INTRODUCTION

Machine and deep learning can give computers the ability "learn" a specific task without expressly programming the computer for that task. This may be accomplished by developing a model (e.g., a mathematical model) based on initial data and then using that model to assess new data. For example, a model may be developed to automatically recognize and distinguish between photos that contain dogs and photos that contain cats.

One problem in machine learning (and deep learning in particular) is that developing such models can take a large amount of resources (e.g., in time, compute power, dataset size, etc.). And with each new task or problem, a new model may need to be developed for addressing that particular task or problem. A model for identifying dogs may be not be as useful for identifying horses or cats. Thus, entirely new models may need to be developed when addressing new types of tasks (e.g., identifying cats versus identifying dogs). However, generating (e.g., training) an entirely new model can be a resource intensive process.

Accordingly, it will be appreciated that new and improved techniques, systems, and processes are continually sought after in machine learning and deep learning. Such techniques may include new and improved techniques in the area of developing models. For example, by preparing or otherwise organizing datasets that may be used to develop new models, which may be trained from already-existing models.

SUMMARY

A computer system is provided and programmed to assemble a plurality of synthetic datasets and blend those synthetic datasets into a synthesized dataset. An evaluator then determines whether an existing model should be associated with the synthesized dataset or a new model should be trained using the synthesized dataset.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

A computer system is provided and programmed to assemble or otherwise generate a dataset from a plurality of frames and choose (or generate) a model for the assembled or otherwise generated dataset. The system uses frames that are labeled (e.g., by a user or other processing) as an input to generate different synthetic datasets that are then mixed using a neural network with adaption for a user-defined retraining problem. In certain examples, the system allows for the transfer of "knowledge" contained in a first model to a new second model that is generated. In certain examples, the knowledge is represented as a dataset (e.g., which may be an optimally generated/selected dataset that is synthesized from multiple different synthetic datasets). The second model may be used to address a different (but potentially related) problem than that already addressed by the first model. For example, a model for detecting dogs in an image (a first model) may be used to generate a new model that is for detecting cats (a second model).

Figure 1:
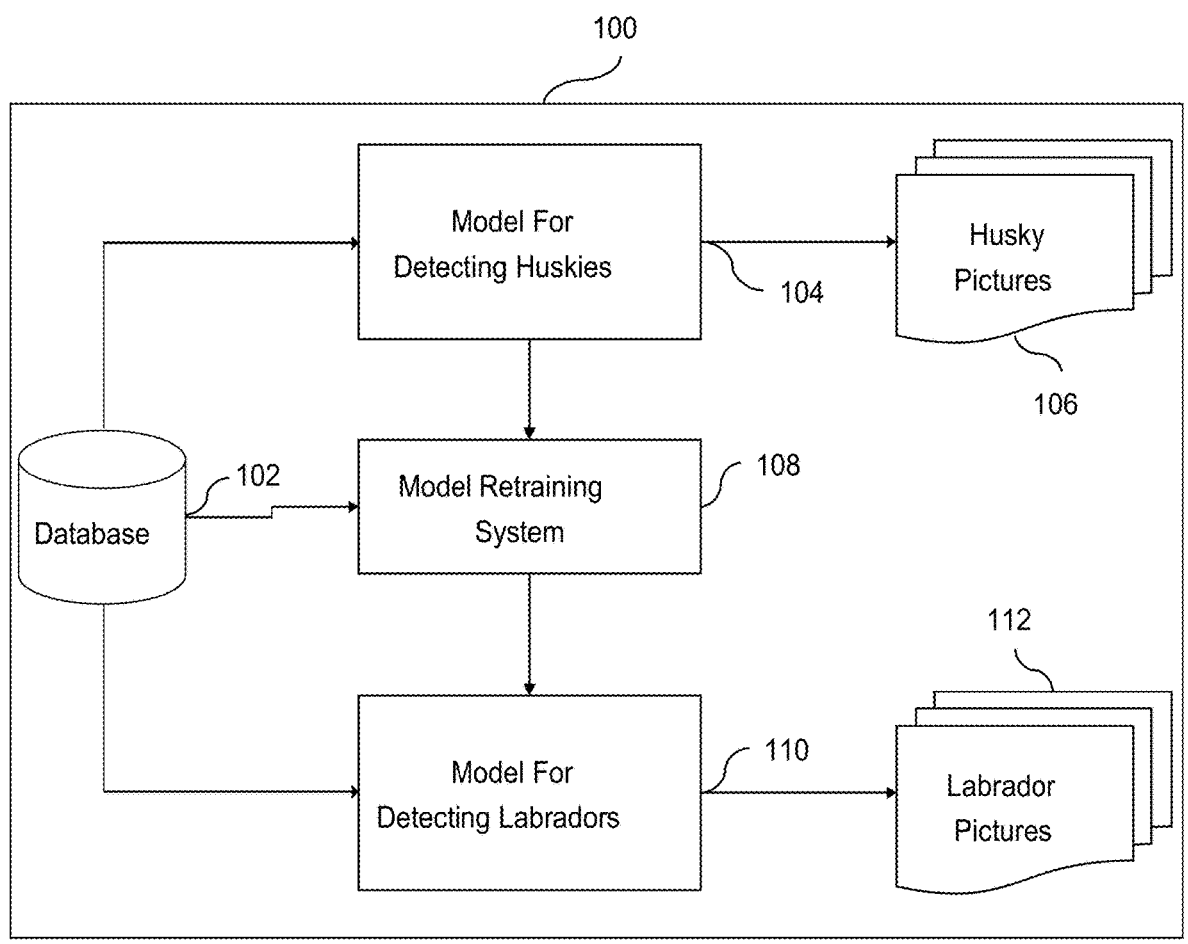
FIG. 1 is a diagram of a computer system configured to handle multiple different models that have been generated by using machine and/or deep learning techniques according to certain example embodiments.
Figure 2:
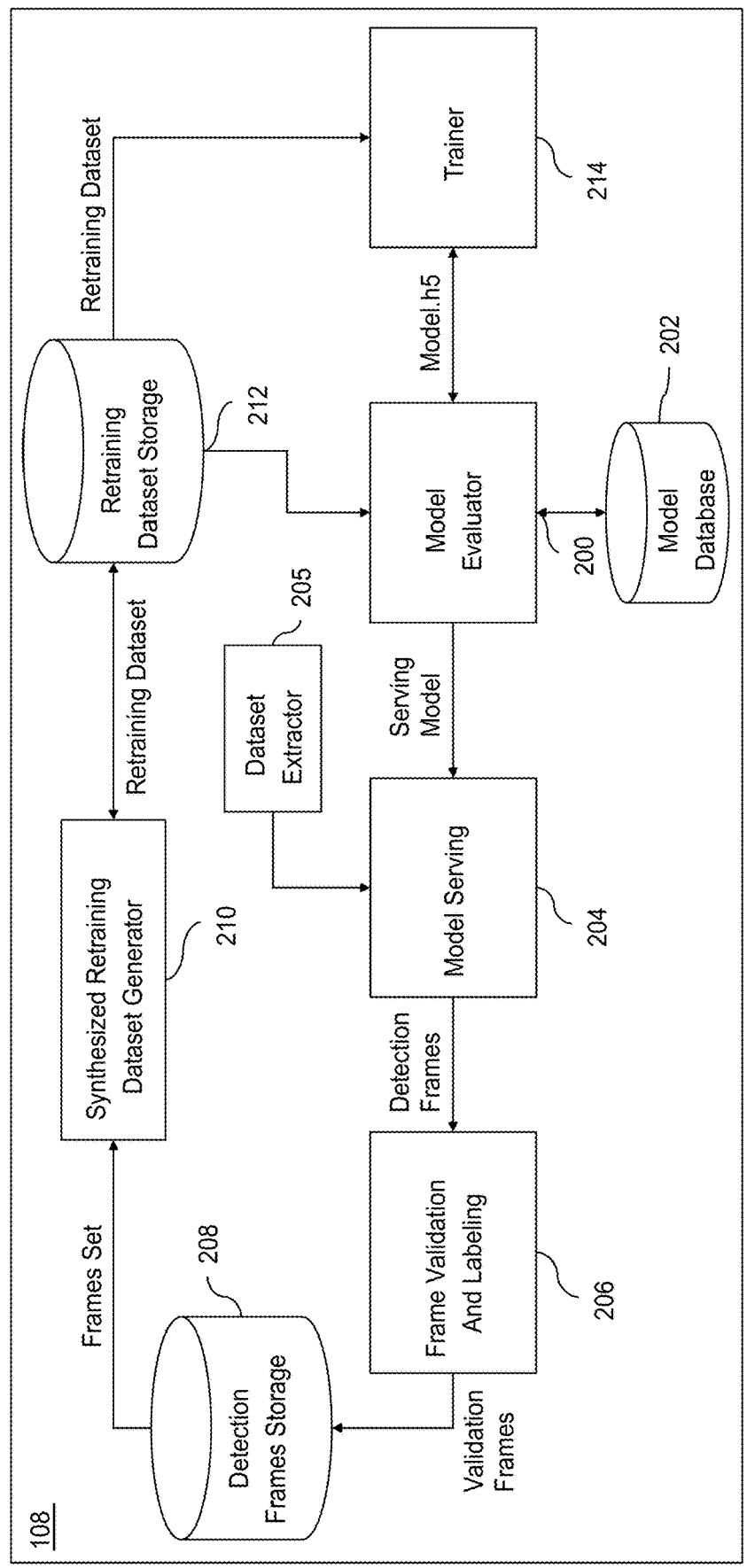
FIG. 2 is a diagram of a computer system configured to select or generate at least one dataset and/or model according to certain example embodiments.
Figure 3:
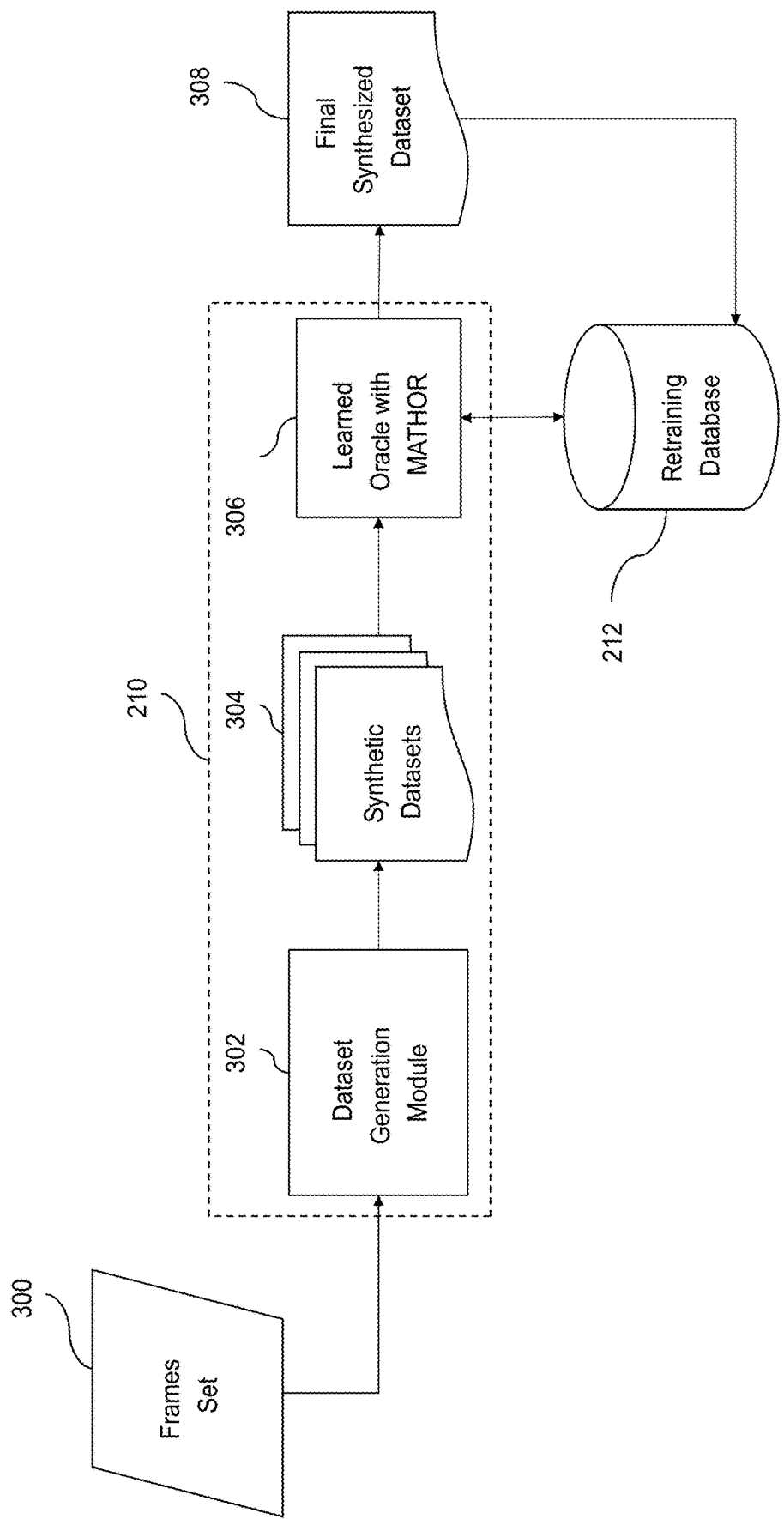
FIG. 3 is a flowchart for the synthetic retraining dataset generator shown in FIG. 2 according to certain example embodiments.
Figure 8:
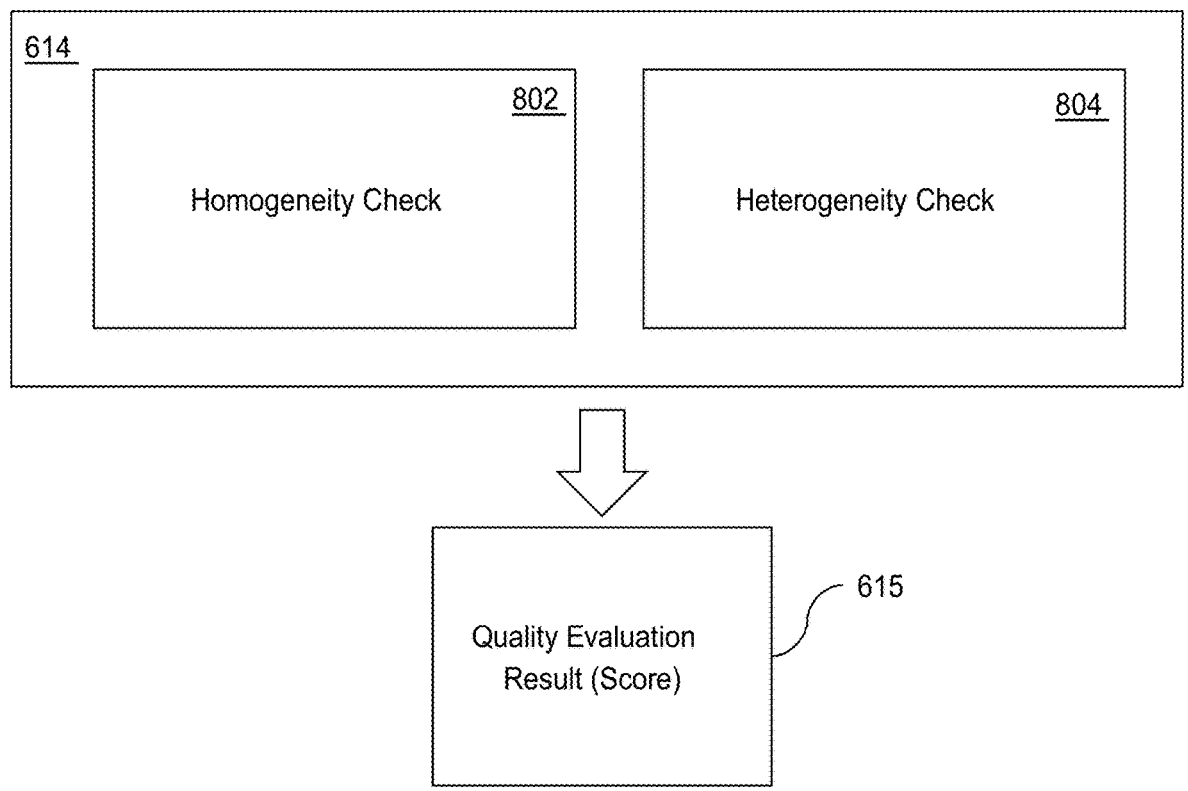
FIG. 8 illustrates the sample-level similarity check that is performed during the MATHOR process shown in FIG. 6.
Figure 9:
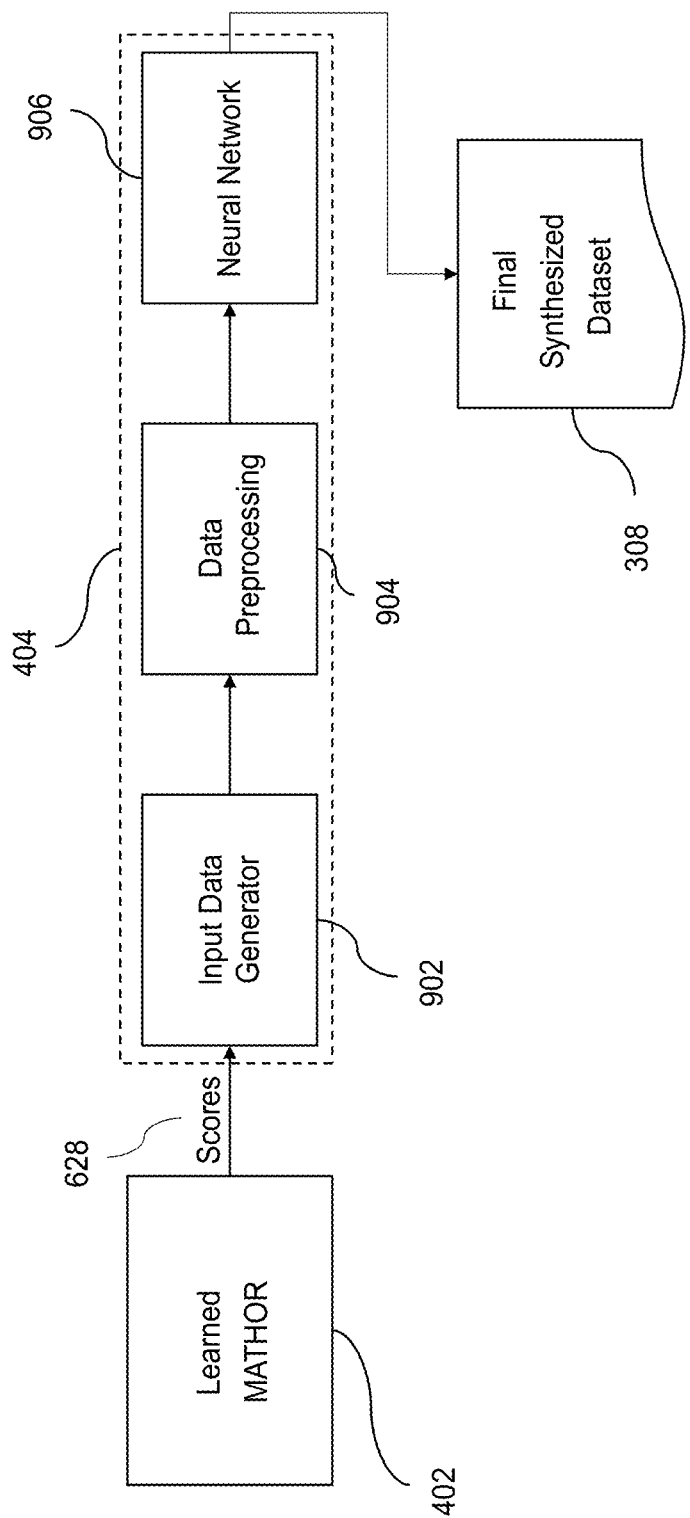
FIG. 9 illustrates the Learned Oracle for Dataset Selection module of FIG. 4 according to certain example embodiments.
Figure 10A:
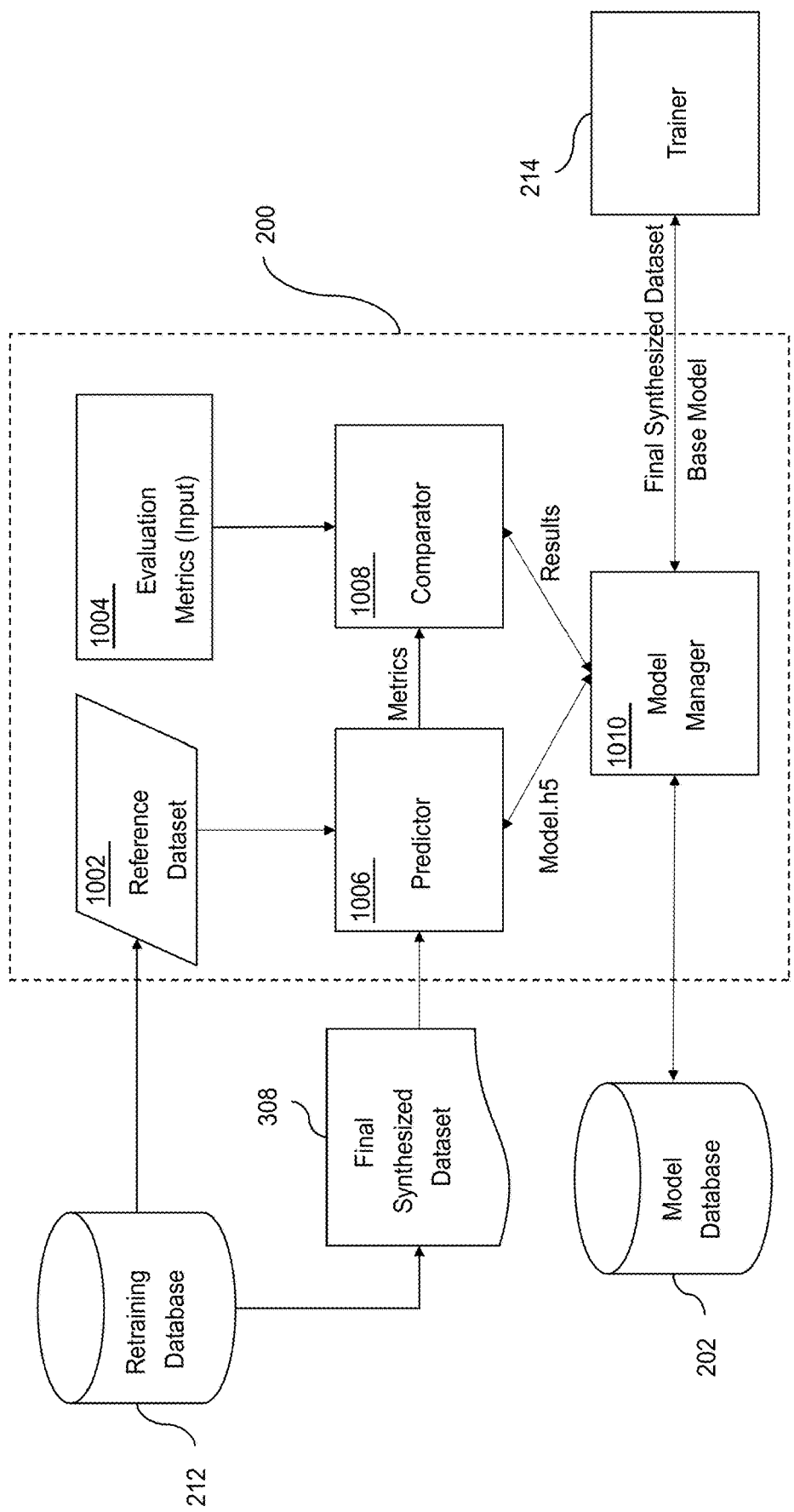
FIG. 10A is a block diagram of the Model Evaluator of FIG. 2 according to certain example embodiments.
Figure 10B:
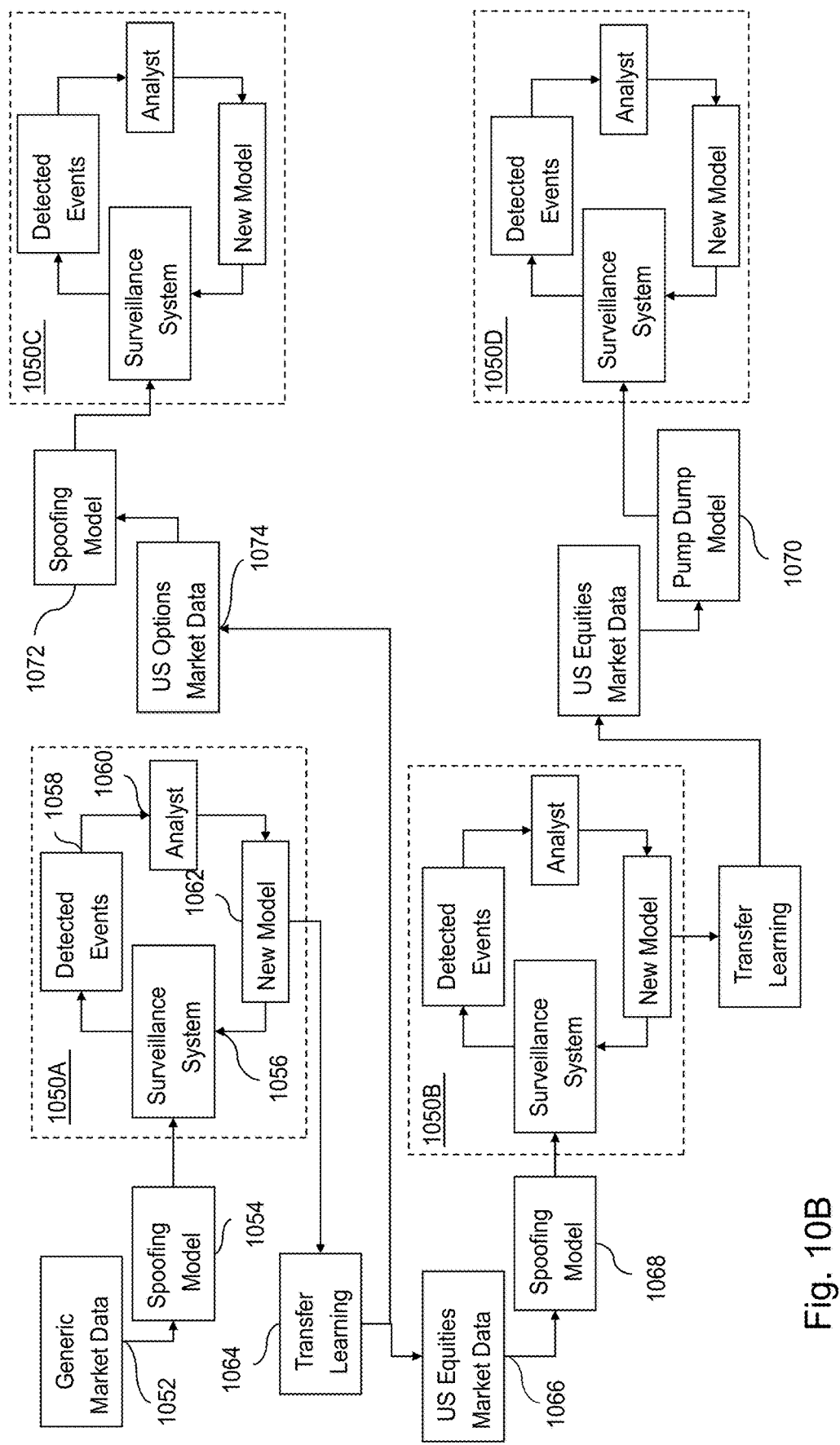
FIG. 10B is a block diagram of an example implementation for how the system of FIG. 2 may be employed according to certain example embodiments.
Figure 11:
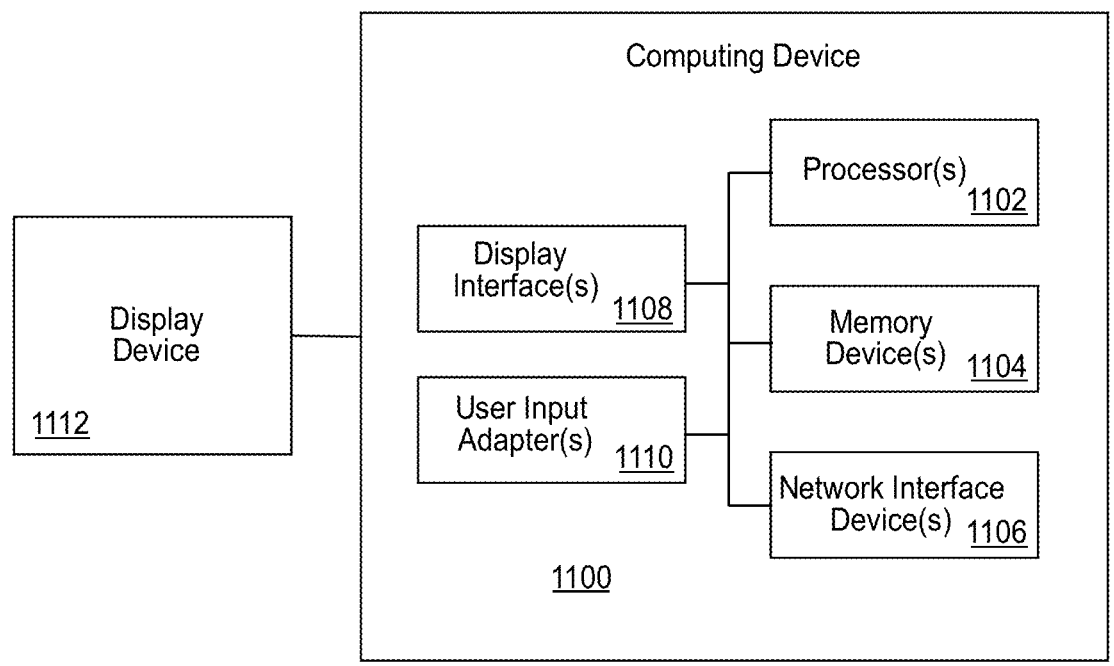
FIG. 11 shows an example computing device that may be used in some embodiments to implement features described herein.

FIG. 1 shows an example of a computer system that processes data by using different models (and thus may be used to address different tasks). FIG. 2 is a block diagram of a model retraining system. FIG. 3 illustrates a synthesized retraining dataset generator that is part of the retraining system of FIG. 2. The synthesized retraining dataset generator includes, among other modules, a Model-Agnostic Tensor HOmogeneity evaluatoR (MATHOR) module. FIGS. 4-9 illustrates different aspects of the MATHOR process that is implemented in the module and is used to determine the similarities between two datasets. FIG. 10A is a block diagram of the model evaluator that is shown in FIG. 2. FIG. 10B shows an example implementation of the techniques discussed herein. FIG. 11 shows an example of a computing device that may be used to implement features described herein.

In many places in this document, software modules, engines, generators, evaluators, extractors, processes, and actions performed by software are described. This is done for ease of description; it should be understood that, whenever it is described in this document that software performs any action, the action is in actuality performed by underlying hardware elements (such as a processor and a memory device) according to the instructions that comprise the software. Further details regarding this are provided below in, among other places, the description of FIG. 11.

Description of FIG. 1

FIG. 1 is a block diagram of computer system 100 that is configured to process multiple different models that have been generated using machine and/or deep learning according to certain example embodiments.

It will be appreciated that deep learning may be viewed as a sub-domain of machine learning. As used herein and unless otherwise indicated, aspects discussed herein that relate to "machine learning" may also be applied to "deep learning" and vice versa.

Computer system 100 stores machine learned models, including models 104 and 110, for processing (e.g., classifying) data that are contained in database 102 (or other data storage medium). An example of computer system 100 includes computing device 1100, which is described in connection with FIG. 11. In certain examples, computer system 100 is comprised of multiple different instances of computing device 1100. In certain examples, computer system 100 may be a cloud-based computer system that includes many different nodes (e.g., each being an instance of computing device 1100). In certain examples, each model that is processed by computer system 100 is processed within its own virtual environment (e.g., a virtual machine or virtual container, such as virtual containers created and/or managed by Kubernetes).

The computer system 100 shown in FIG. 1 includes two different machine learned models, a model for detecting huskies 104 and a model for detecting Labradors 110. Other types of models may also be included depending on the nature of the task to be solved or addressed. For example, a model may be generated to assist in identifying irregular or fraudulent market activity from data supplied by an automated computer system that operates a matching platform or exchange. In certain examples, one model may be used by system 100 or many different models may be used for classifying data (e.g., one model could be used for classifying Labradors and huskies).

Computer system 100 includes a database of data 102 (e.g., images or other data). The system is programmed to take the data (e.g., images, time series data, etc.) contained in database 102 and process that data by using models 104 and 110. This will result in, for example, identifying those images that contain huskies 106 and those that contain Labradors 112. Database 102 can also include data that is provided in "real-time." An example of "real-time" data may be market data feed that is provided from an electronic exchange system. This data may be supplied to system 100 and then used against the models. Another example may be a video stream (or periodically provided images) that are to be processed against models of system 100.

In certain examples, the models that are used by system 100 may be stored in a database and retrieved for use based on the nature of a particular task. An example of such a database is model database 202 in FIG. 2. For example, if a task is to identify huskies in 10,000 new images then the model for detecting huskies may be dynamically retrieved from a database (perhaps by using the model evaluator 200 of FIG. 2) of models and used for classifying/analyzing the 10,000 images. If, however, the nature of the task is to analyze market conditions to spot fraudulent activity, then a model for such a task may be retrieved from model database 202. In certain examples, the determination of which model to use for classifying the unclassified data (e.g., data that has yet to be classified by using a model) may be made by using the results of a MATHOR process (e.g., similar to that described in FIG. 6). As discussed in greater detail below, the MATHOR process may provide metrics on how similar or different two datasets are. Such metrics may then be used to select a model. In other words, if the unclassified dataset is similar to an already classified dataset that is associated with an existing model, then the existing model may be selected for the classifying the unclassified data.

In certain instances, a task may not have a corresponding model for that particular task. For example, no model may exist for detecting fraudulent activity in an equities market or no model for detecting Labradors in images. IN certain examples, a model must be generated so that particular task may be performed. In certain example embodiments, a new model may be generated using traditional techniques for generating a model using machine learning. For example, by using a neural network or the like. However, it will be appreciated that generating a new model can be a relatively resource intensive task. The generation of a model can be even more difficult when the training dataset size is relatively small. For example, if there are relatively few pictures of Labradors in the picture database for training purposes then it may be difficult to develop an accurate/useful model for identifying Labradors.

In certain example embodiments, computer system 100 may include a model retraining system 108. In certain examples, the model retraining system 108 may be its own computer system and separate from computer system 100. For example, system 108 and 100 may be provided on separate nodes of a cloud-based computing environment. The model retraining system 108 is programmed to generate or develop new models for handling new and/or different tasks. Model retraining system 108 may have access to the same data sources (e.g., database 102) that models 104 and 110 have. For example, model retraining system 108 may have access to a daily collection of new images, a real-time market data feed from an electronic matching platform, or other data.

Model retraining system 108 may be implemented on one or more computing devices 1100 which are described in connection with FIG. 11. The model retraining system 108 may allow for generating new models from existing models and/or data without the need to train a new model from scratch—or provide for more intelligent training (e.g., that is perhaps more efficient than a traditional brute force approach). Such techniques can thus save in the resources (time, compute power, acquiring training datasets, etc.) that may be needed to generate and/or select new models.

Description of FIG. 2

FIG. 2 is a diagram of the components that may be included in the model retraining system 108 shown in FIG. 1. Model retraining system 108 may be configured to select or generate at least one dataset for generating a new trained model according to certain example embodiments. Each of the modules or other components shown in FIG. 2 may be implemented on a computer system (e.g., computing devices 1100) that is programmed to generate or train new models based on existing models and corresponding datasets.

The description and operation of the modules in FIG. 2 is, in certain instances, described in connection with an example for identifying dogs within images and/or identifying spoofing within market data. For the dog example, a model 104 for detecting huskies is stored in the model database 202. However, a model 110 for detecting Labradors is now desired. The model retraining system 108 will use the already generated model 104 to generate a new model 110 that is trained with a dataset that is itself constructed using machine learning techniques. For the spoofing example, a model exists that is used to detect spoofing on a commodities market. Now a model for detecting spoofing in an equities market is desired. Both of these examples are discussed in connection with the features described herein. It will be appreciated that the techniques described herein are applicable in other areas where models may be used to analyze or classify different types of data.

The process starts with selecting an initial model (e.g., model 104) from among models that are stored in model database 202. This is accomplished by the model evaluator module 200. The details of the model evaluator module are described in greater detail in connection with FIG. 10A. In certain examples, the processing show in FIG. 2 occurs in a loop (as illustrated in FIG. 2). Accordingly, the selection process for a model by the model evaluator 200 may be different during a "first" iteration than subsequent iterations. For example, during the first or initial iteration a model may be selected manually by a user, may be selected randomly from among the models stored in the model database, or trained from scratch.

The model database 202 may store many different models that have all been developed for different tasks (e.g., tens, hundreds, or even thousands). The model that is selected may be one that a user (or the model evaluator 200) thinks is "closest" to the problem they are addressing. Thus, if the database 202 contains models for identifying different breeds of dogs and models for predicting weather, then a user may (given the task of identifying Labradors in photos) select one of the models for identifying a dog breed and use that model as a starting point. The determination of how close a model is to a given problem may be achieved (at least indirectly) by performing the MATHOR processing discussed below. Thus, in certain examples, the selection of a model may be a manual process (user driven where a user manually selects a model), a semi-manual process (e.g., a user selects one of multiple options that are chosen by the system), or automated (the computing system automatically selects a model without direct user input).

As the process being performed by system 108 progresses (e.g., each iteration) the model evaluator 200 may also grade or score models (and/or the datasets associated with each model) in connection with a target. Thus, for example, the different models contained in the database 202 may be scored for how well they perform at (for example) identifying Labradors in connection with a given dataset. As noted above, the details for the model evaluator and its functionality are discussed in connection with FIG. 10A.

In any event, the model evaluator 200 selects a model and serves that model to the model serving module 204. The model serving module 204 then executes that model against a dataset that is provided by dataset extractor module 205.

The dataset provided by the dataset extractor 205 may be a dataset that is comprised of previously unclassified data (or data that has not been processed against the model selected by the model evaluator 200). Returning to our dog example, the dataset that is provided by the dataset extractor 205 may be a collection of pictures or the like. The model serving module 204 uses the provided model (the model that is used to identify huskies) to identify Labrador dogs within the dataset that is provided by the dataset extractor 205. In other words, the provided model is used to run an initial prediction against the dataset (e.g., new and previously unclassified images) provided by dataset extractor 205. The initial prediction includes attempts to classify/identify Labrador dogs using the provided model. Each of the frames (e.g., each image, or other "frame" of data that is being assessed by the model) is classified according to the model that is provided by the model serving module.

Naturally, the nature of the task being performed may dictate the nature of the dataset being served by the dataset extractor 205 to the model serving model 204. For example, if a model is being developed to detect fraudulent market activity, then the dataset may be time series market data or the like. It will also be appreciated that the dataset that is provided from the dataset extractor 205 should be data that is different from the data that was used to initially train the model that is provided from the model evaluator 200. Thus, if the model for huskies was trained using dataset A, then the dataset extractor 205 should provide a different dataset B (e.g., from a different set of photos). Similarly, in the context of detecting fraudulent market activity, the dataset that is used to train a model may be from a first time period (e.g. the first quarter of 2018) while the dataset provided by the dataset extractor 205 may be from another time period (e.g., the second quarter of 2018). In certain examples, the datasets may be from different sources (e.g., one from a commodities market and another from an equities market and/or one from a first exchange and another from a second exchange).

Once the predictions are performed by processing the dataset against the model, then the Frame Validation and Labeling module 206 is used to validate and/or label detected frames. In certain examples, this may be a manual process where a human (e.g., a data scientist) goes through the classified frames (e.g., images) and labels and/or validates the predictions made by the model serving module 204. In certain instances, the validation and/or labeling may be an automated process. In certain examples, module 206 may be partially automated where a human will be used to validate and/or label some (but not all) of the data that has been processed via the model serving module 204. In any event, the detection frames produced by the model serving module 204 are validated and those validated and/or labeled frames are stored to detection storage 208.

In certain examples, the frame validation and labeling module 206 may employ techniques described in U.S. Provisional Application No. 62/689,545, the entire contents of which being hereby incorporated by reference. In particular, the windows mentioned in the '545 application may be the frames that are being validated and/or labeled. Accordingly, the frames discussed herein may be, for example, spatial in nature (e.g., images or portions of images), temporal in nature (e.g., a time frame as in the '545 application), contextual in nature (e.g., different sections of a document, each sentence of book, etc.), or the like. Indeed, a frame may be any portion of a dataset that can be divided or separated from other data within that dataset.

The validated and/or labeled frames (e.g., the results of processing from 204 and the validations and/or labeling from 206) are then stored to detection frame storage 208. A reference to the model that initially classified the frames/images/etc. is also stored so that the model that originally conducted the classification may be referred to later. This reference (a link between the labeled/validated dataset to a model) may allow the MATHOR results discussed below (which generate dataset metrics) to grade how well a particular model is at addressing a given task.

After the frames of data are stored to storage 208, then the process proceeds to generate one or more new datasets. These new datasets may be based on the frames stored in storage 208. The new datasets may be used to train a new model (e.g., a model for the target task, such as identifying Labradors in photos). The process may operate to intelligently construct a dataset that will be used for the training/retraining. The intelligent construction of the dataset will use machine learning to optimally (e.g., that performs at least better than a random selection of data) select the data to be included into the dataset that is used for training. It will be appreciated that constructing a dataset for training in this manner may decrease the training time required for the new model and/or increase the accuracy of the model (e.g., reduce the error rate of the eventually constructed model).

The detection frames stored in the detection frame storage 208 are supplied to Synthesized Retraining Dataset Generator 210. This is described in greater detail in connection with at least FIGS. 3-9. The output from the Generator 210 is a retraining dataset (final synthesized dataset 308). The retraining dataset that is output can be viewed as a dataset that is constructed by the generator 210 to achieve the defined goal. Returning to the dog example, a generated dataset may be one that is designed to effectively produce a model that identifies Labradors (and potentially Huskies as well). It will be appreciated that the dataset that is generated is different from just training a model using all of the detection frames contained in storage 208 or randomly selecting frames to train such a model. Rather, the retraining dataset may be viewed as a product of a machine learned process that produces the retraining dataset (e.g., it is produced by the Synthesized Retraining Dataset Generator 210).

The retraining dataset that is produced from the Synthesized Retraining Dataset Generator 210 is then stored to storage 212. In certain example embodiments, the datasets that are stored in storage 212 are all paired with a corresponding model (e.g., the model that was used to generate the initial predictions in the model serving module 204). In certain example embodiments, the retraining dataset may also be applied to trainer 214 to produce a model (e.g., an h5 file) that is then passed back to the model evaluator 200 that evaluates the recently created model. In other words, the dataset that is created using generator 210 may then be used to train a new model (e.g., a model that is used to identify Labradors). The newly created model may be evaluated by the model evaluator 200. The evaluation process is discussed in greater detail in connection with FIG. 10A. The newly created model may then be served to the model serving module 204 and the loop may continue. In certain examples, the model evaluator 200 may determine that training is not needed for a new model. Instead, the model evaluator may determine, based on the dataset output from the generator 210, that an already existing model stored in model database 202 will perform within a defined error threshold for the given task. In other words, the model evaluator 200 may not only grade newly trained models, but may determine when already existing models may be sufficient for a given task.

Description of FIG. 3: Synthetic Retraining Dataset Generator

FIG. 3 is a flowchart for the Synthetic Retraining Dataset Generator 210 shown in FIG. 2 according to certain example embodiments.

The synthetic retraining dataset generator 210 is designed to generate a synthesized dataset that is to be used for retraining/training purposes. As part of this process, the synthetic retraining dataset generator 210 uses multiple different dataset generation techniques to initially create multiple synthetic datasets. The techniques may result in synthetic datasets that include different combinations of the validated frames stored in detection frames storage 208.

In FIG. 3, the frames set 300 includes those detection frames from detection frames storage 208 that are relevant (or potentially relevant) in creating a new dynamic, custom and/or synthetic dataset. In certain example embodiments, the frames set 300 includes those frames that are for the task or problem that to be addressed and may, in certain instances, be the result of multiple different classification predictions as a result of using multiple different models. In certain examples, frame set 300 includes frames that have been classified using the model serving module 204 and then subsequently validated and/or labeled via module 206 (as discussed above). In certain example embodiments, all of the frames associated with the same model (the model provided by the model serving module 204) are included in the frames set 300.

The synthetic retraining dataset generator 210 includes a dataset generation module 302 that comprises different dataset generation techniques. These techniques are used to produce multiple synthetic datasets 304. The synthetic datasets 304 are then passed to the Learned Oracle with MATHOR module 306 for processing. The Learned Oracle with MATHOR module 306 uses the synthetic datasets 304 in combination with previously generated retraining datasets (e.g., reference datasets) that are stored in retraining database 212 to produce a final synthesized dataset 308, which is then stored in the retraining database 212 (along with the other previously stored synthesized datasets).

The dataset generation techniques included in module 302 may include one or more of the following techniques to generate a synthetic dataset. A first technique may be to randomly select frames from the frame set 300. A second technique may be to select those frames in which the model tested by the model serving module 204 made a mistake (e.g., where the model classification from 204 is not in agreement with the labeling from module 206). For example, if the model classified a photo as having a Labrador when in fact the animal was a wolf. A third technique could be to pick some portion of samples that correctly identify one property (e.g., those samples that correctly identify Huskies) and some portion that correctly identify a second property (e.g., samples that correctly identify Labradors). Other techniques may also be used for generating synthetic datasets. Indeed, some may be very specific in nature. As an example of the specificity that may be involved in the data generation of a synthetic dataset, a dataset may be comprised of incorrectly identified husky photos that have snow in the background. As another example, frames the synthetic dataset may be based on specific properties of the frames. For example, only those frames (assuming the frames are time series in nature) that fall within a certain time frame may be included in the datasets. In certain example embodiments, the frames for the datasets may be based on certain properties of the features of the data (e.g., sparsity, distribution, etc. . . . ). Accordingly, multiple different synthetic datasets 304 may be generated by the dataset generator module 302. In certain examples, the number of generated datasets may be, for example, at least 10 different synthetic datasets.

Once the synthetic datasets 304 are generated then they are passed to the learned oracle with MATHOR module 306 that is used to produce a final synthesized dataset 308.

Description of FIGS. 4-9: Learned Oracle with MATHOR

Figure 4:
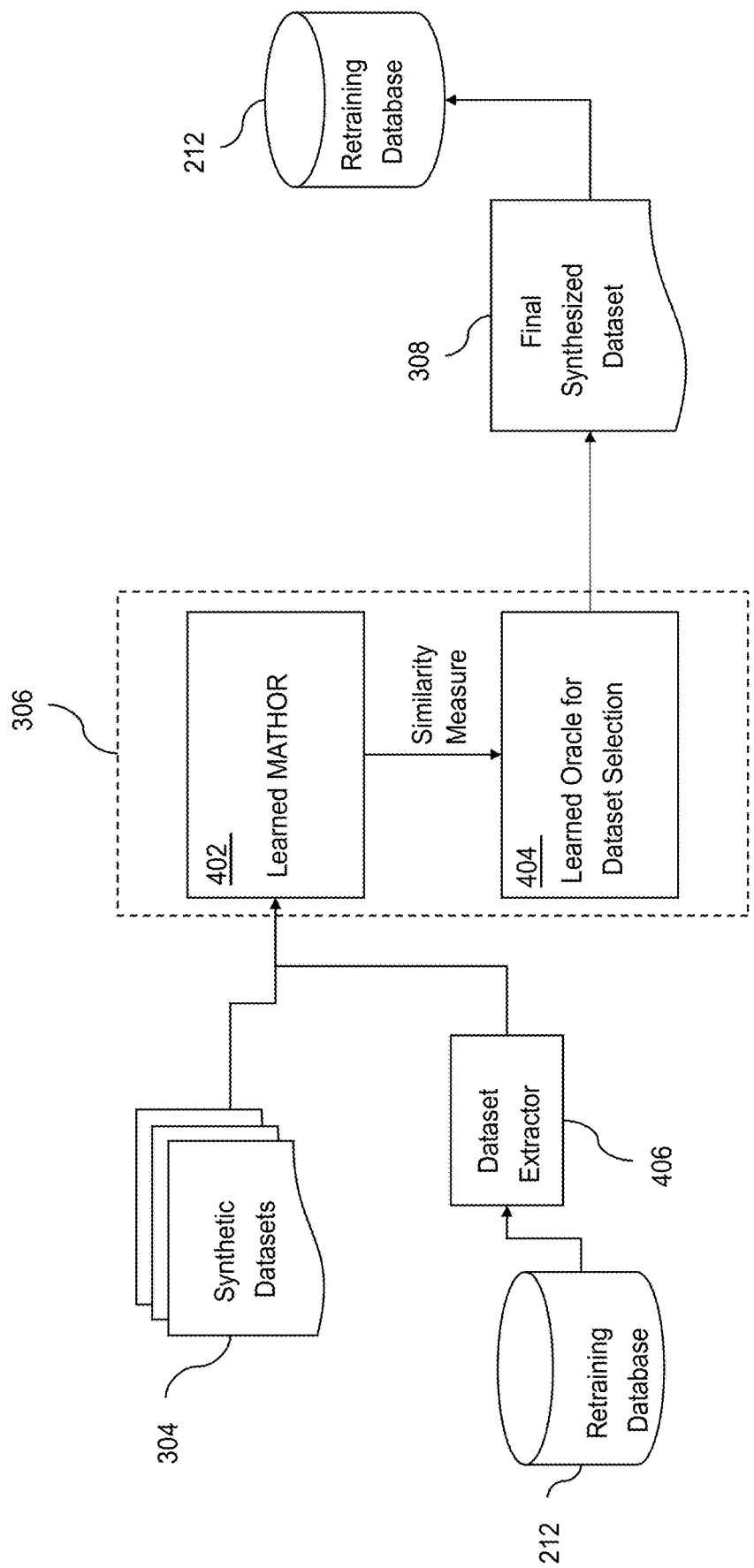
FIG. 4 is a block diagram that includes the Learned Oracle with Model-Agnostic Tensor HOmogeneity evaluatoR (MATHOR) module shown in FIG. 3 according to certain example embodiments.
Figure 5:
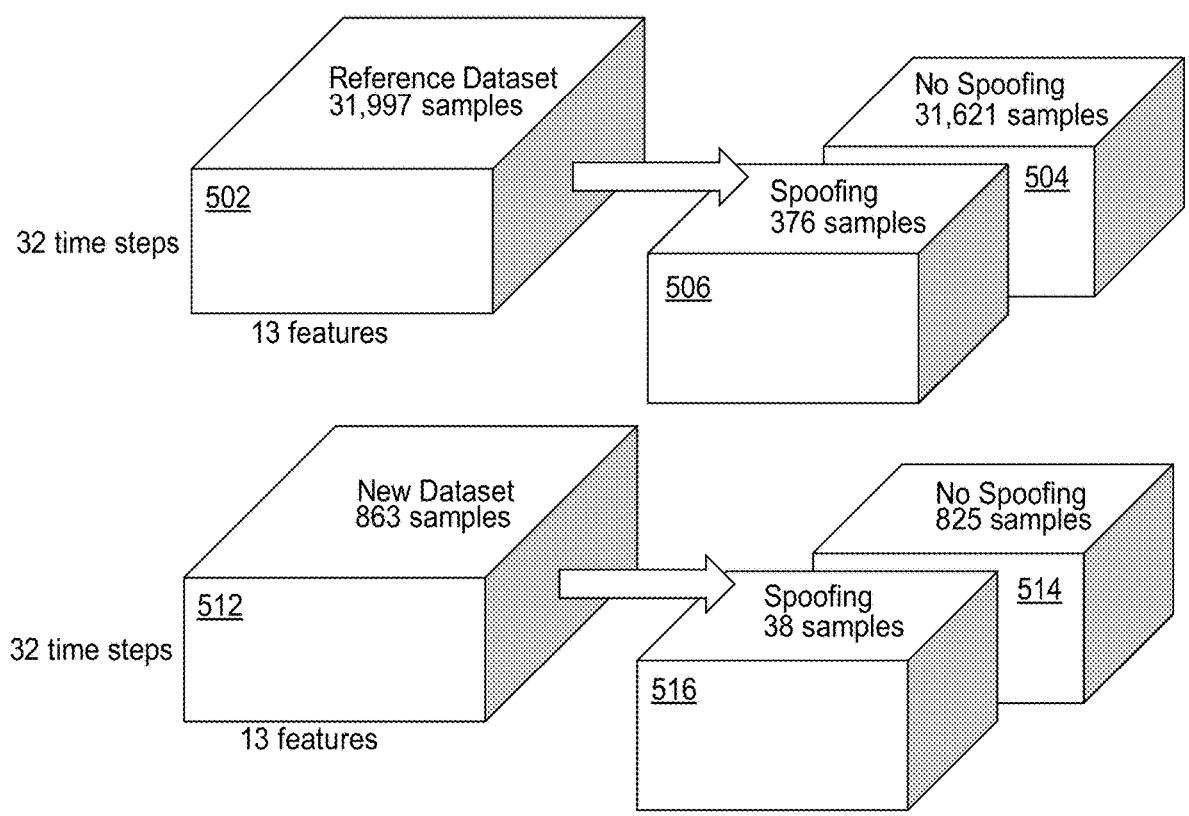
FIG. 5 shows an example of datasets that may be processed using MATHOR according to certain example embodiments.
Figure 6:
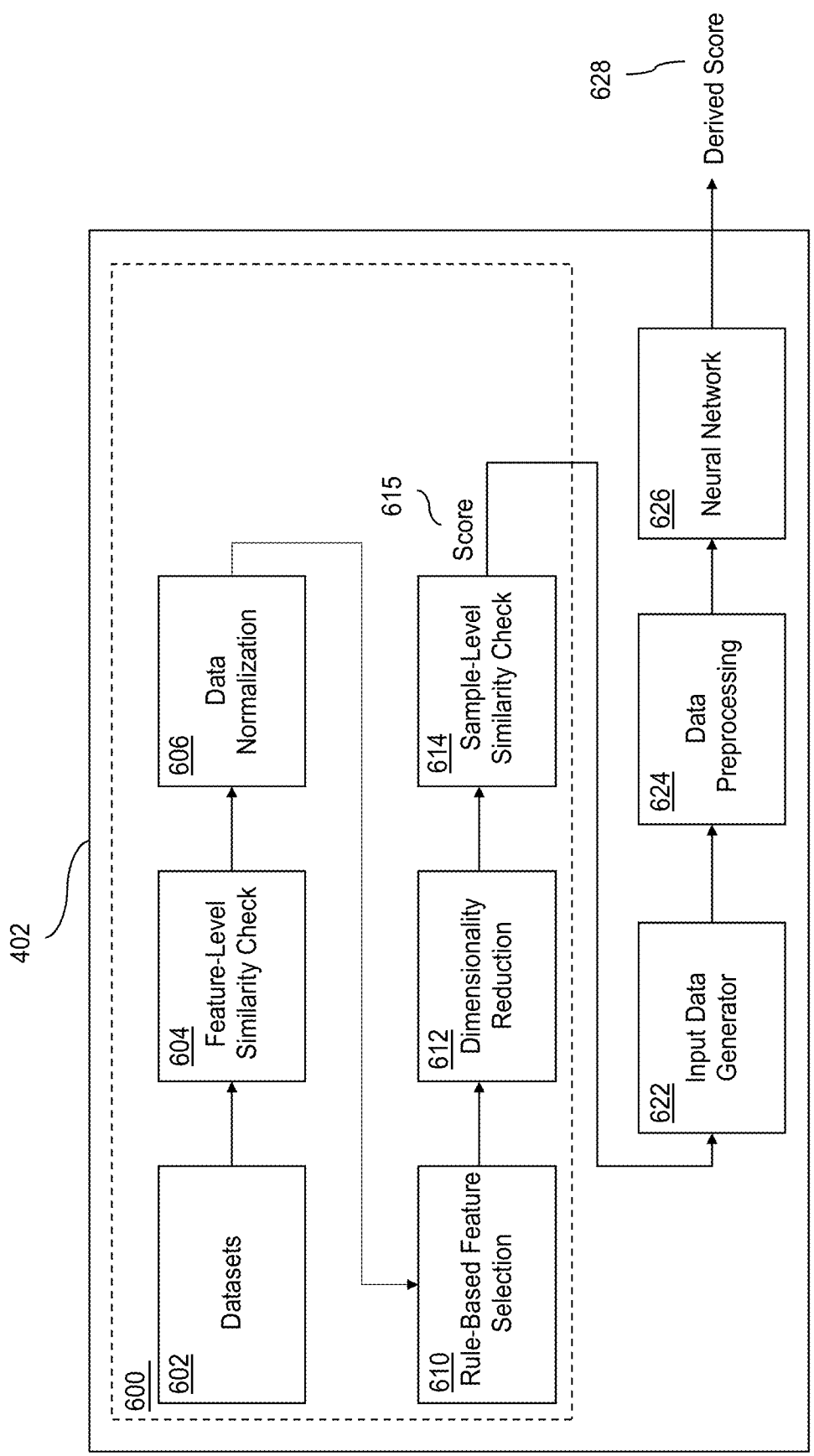
FIG. 6 shows a MATHOR process that is provided in the Learned MATHOR module of FIG. 4 according to certain example embodiments.
Figure 7:
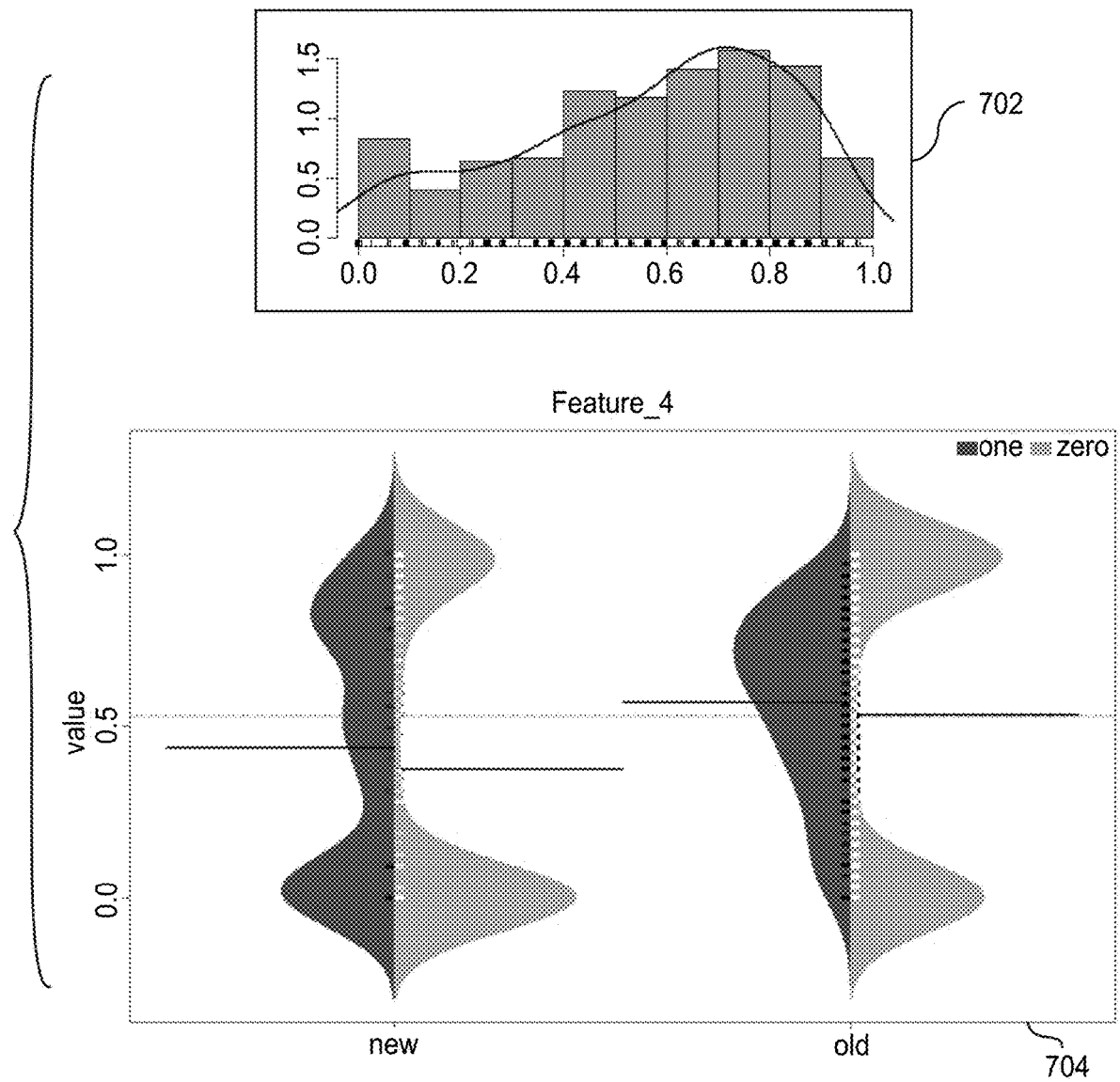
FIG. 7 shows example density estimate curves that may be calculated as part of the MATHOR process of FIG. 6.

FIG. 4 is a block diagram of the Learned Oracle with MATHOR module 306 shown in FIG. 3 according to certain example embodiments. FIG. 5 shows how example datasets may be processed using MATHOR. FIG. 6 shows a MATHOR process that may be used by the learned MATHOR module of FIG. 4. FIG. 7 includes graphical examples showing geometric proximity between datasets. FIG. 8 is a block diagram for how a score that measures the similarity between samples can be generated. FIG. 9 is a block diagram of a learned oracle for dataset selection from FIG. 4.

MATHOR is an acronym and stands for Model-Agnostic Tensor HOmogeneity evaluatoR. The techniques underlying MATHOR are, as the name suggests, model agnostic in nature and allow for evaluating tensors for similarities or dissimilarities. Tensors may be viewed as a structure that holds N dimensions of data. For example, while a vector may hold data in one dimension (e.g., a 1 dimensional tensor), tensors refer to a more flexible approach of describing N dimensions of data. Tensors can also include additional attributes, properties, etc. that are more than just the data contained in the tensor. For ease of description herein, tensors may also be referred to as datasets.

Examples of tensors are graphically shown in FIG. 5. The tensors in FIG. 5 are for data related to market activity and the task that is to be solved is identifying whether spoofing is occurring within a market. Further discussion of how spoofing may be identified is found in U.S. Provisional Application No. 62/689,545), the entire contents being hereby incorporated by reference.

Datasets 502 and 512 in FIG. 5 are comprised of many different samples, with each sample including multiple features (e.g., an individual property for a sample) across multiple time steps (e.g., time periods). The time steps may be specific windows of time within the overall time series dataset and, in certain instances, the windows may overlap in time. The nature of the features included in a dataset can vary based on the nature of the task being addressed by the model. For example, features included in datasets for image recognition may be different than features included in datasets for spoofing detection. In the example shown in FIG. 5, the first dataset 502 is a reference dataset and contains samples that have been identified as containing spoofing (506) and those have been identified as not containing spoofing (504). The reference dataset 502 may be stored in and supplied from the retraining database 212. The reference dataset 502 may be selected as a dataset that was already processed by the model that was served to the model serving module 204.

The other dataset in FIG. 5 is dataset 512. This is a "new" dataset and may be one of the synthetic datasets 304 that have been generated as described in connection with FIG. 3. Dataset 512 is similarly split into datasets 514, in which spoofing is not predicted, and dataset 514 in which spoofing is predicted. Naturally, the datasets may be split in other manners depending on the nature of the task. For example, if a model is being developed to identifying Labradors (as discussed elsewhere herein), a dataset may be separated between those instances (e.g., images) in which Labs are found and those in which Labs are not.

In general, the process that is performed by MATHOR (as discussed in connection with FIG. 6) is used to determine how similar (and/or how different) two tensors are (e.g., a reference tensor to a synthetically generated tensor). The output from a MATHOR process may be, for example, a similarity measure, score or other metric(s). MATHOR may thus be used to score how similar a reference dataset is to each of the synthetic datasets 304.

Returning to FIG. 4, the Learned Oracle with MATHOR module 306 includes a learned MATHOR module 402 and a learned oracle for dataset selection module 404. Modules 402 and 404 work in tandem to produce a final synthesized dataset 308.

Learned MATHOR module 402 (described in greater detail in FIG. 6) is a learned oracle for metric selection and uses a neural network to assign weights (e.g., priority) to metrics provided by MATHOR corresponding to classification of problems. Module 402 takes the synthetic datasets 304 as input and at least one reference dataset that is provided by the dataset extractor 406. The reference dataset may be a dataset that is already associated with the model that was provided by the model serving module 204. The learned MATHOR module 402 produces weighted metrics based on the MATHOR processing. These metrics may be thought of as data on which features of the synthetic datasets are considered more impactful or relevant to the particular problem that is being addressed by the model associated with the reference dataset.

The generated weighted metrics are passed to the learned oracle for dataset selection 404 that then uses a neural network to generate an optimal subset from the various synthetic datasets based on the similarity information produced by the learned MATHOR module 402.

The learned MATHOR module 402 will now be discussed in greater detail. The learned MATHOR module 402 includes a MATHOR process 600 for performing MATHOR and a separate step that uses the output of MATHOR in a neural network to weight the MATHOR results.

The MATHOR process 600 generates metrics (e.g., feature metrics) regarding two different datasets 602. This process is executed for each of the synthetic datasets and the reference dataset that is supplied from the dataset extractor 406. Thus, if there are 10 generated synthetic datasets (e.g., $A_1$-$A_{10}$), then each of those datasets is run though the MATHOR process with the provided reference dataset. An example of such datasets are datasets 502 (a reference dataset) and 512 (a newly generated synthetic dataset).

Once the datasets are obtained, then a feature-level similarly check (e.g., a process) is performed on those datasets at 604. Specifically, as part of 604, a geometric proximity table may be generated for each feature in the datasets and each sample (e.g., each row being each sample, and the columns being each feature). A density estimate curve may then be calculated for each feature based on the geometric proximity table data.

FIG. 7 shows an example density estimate curve 702 for a feature across the samples within a given dataset. A density estimate curve is calculated for each of the features of the respective datasets (e.g., 504, 506, 514, and 516). An example of these calculations is shown in graph 704. In graph 704, the left graph of 704 shows the new dataset 512 with the density estimate curve for a positive identification of spoofing on the left and a positive identification of non-spoofing on the right of the left dual-sided curve. The right dual graph similarly shows identification of spoofing on the left and a positive identification of non-spoofing on the right.

From the plural different density estimate curves (e.g., 4) a geometric similarity may be computed based on one or more proximity metrics. The following are example metrics that may be used to measure the pairwise geometric proximity of the density curves.

$$p(P_1, P_2) = \int_\Omega \left(\frac{dP_1}{dv} * \frac{dP_2}{dv}\right)^{1/2} dv, P_i(i=1,2) \text{ with respet to } v \quad \text{Equation 1}$$

Where $$\frac{dP_i}{dv}$$

is the Radon-Nikodym derivative of $P_i$ (i=1, 2) with respect to v.

$$y = \frac{\langle x - \bar{x}, y - \bar{y}\rangle}{\|x - \bar{x}\|\|y - \bar{y}\|} \quad \text{Equation 2}$$

$$DM_{jk} = \left(\sum_{i=1}^{n} w_{ijk}\left[\frac{x_{ij} - x_{ik}}{q_{ijk}}\right]^2\right)^{1/2} \quad \text{Equation 3}$$

Where $w_{ijk}$=0 if the comparison of objects j and k for variable i is invalid for lack of data, otherwise $w_{ijk}$=1.

$$d_{JW}(x, y) = 1 - J_W(x, y) = \frac{\Sigma_i \min(x_i, y_i)}{\Sigma_i \max(x_i, y_i)} \quad \text{Equation 4}$$

One or more of the above equations may be used. Other equations for calculating proximity may also be used.

For a feature to be useful (e.g., a feature that will be useful in training a model), the similarity between classes within individual datasets should be smaller than a first threshold and the similarity of the same class across datasets should be larger than a second threshold. Features that meet these parameters may be considered features with separability and/or usable.

In certain example embodiments, the data from the feature-level similarity check at 604 is then normalized at 606. This may involve, for example, a 100 to 1 reduction in dataset size.

At 610, features are selected using a rule-based approach. In certain example embodiments, the selection of features using this approach is designed to select features that have separability that is greater than a threshold amount. This can be accomplished by defining one or more criteria that a feature must meet in order to be selected at 610. In certain example embodiments, the number of criteria may be two or more. Example criteria may be, for example, to select those features that have a maximum cosine distance of X and/or filtering based on the similarity scores generated from feature similarity check at 604/606. In certain examples, the criteria may be decided by, for example, a data scientist or other user that is performing/supervising the MATHOR process (or the retraining process as a whole).

In certain examples, certain features may automatically be suggested based on the nature of the underlying task that is to be performed. For example, certain features/criteria associated with image classification may be suggested based on previously analyzed images. Similarly, certain features or criteria that tend to provide for greater separability may be suggested for time series data. As noted above, two (or more) different criteria may be provided and only those features that satisfy both criteria may be selected for future use in developing the retraining dataset. In other examples, one criteron or three or more criteria may be used.

Next, at 612, the dimensionality of the tensor (dataset) may be reduced. This may act to reduce or decrease the complexity, noise, and/or dimensions of the tensor. An example reduction process may be Higher Order Singular Value Decomposition (HOSVD). This process may be useful in denoising complex data streams (e.g., like the market data that is used to detect spoofing).

After reducing the dimensions of the dataset, then the MATHOR process 600 performs a sample-level similarity check at 614. This is illustratively shown in FIG. 8. The sample-level similarity check 614 measures the sample similarity within each of the individual datasets and across datasets. This includes two separate checks. The first is a homogeneity check 802 and the second is a heterogeneity check 804. The homogeneity check is used to measure how similar the same classes are across different datasets while the heterogeneity check is used to measure how dissimilar different classes are within the same dataset. In certain example embodiments, the homogeneity check and the heterogeneity check are determined based on calculated geometric morphometrics from the datasets.

For example and referring to the dog example discussed herein, the homogeneity check is used to check how similar the Labrador images in the two different datasets (502 and 512) are. In contrast the heterogeneity check is used to check how dissimilar the Husky and Labrador images are within a given dataset (e.g., 516 vs 514).

These two checks are then used to produce score 615 (e.g., a quality evaluation result) or metric. In certain example embodiments, the quality evaluation result or score may include multiple components or pieces. Thus, the score may be more complex and/or detailed than a simple integer. Instead, it may be or be based on a various metrics (e.g., properties) of the individual synthetic datasets that are generated using the MATHOR process 600.

Once the MATHOR process 600 is complete, then the output (e.g., metric data 615) from that process is provided to input data generator 622. The metric data is then passed to the data preprocessing step 624 that performs data clean up processing (e.g., handling NaN, nulls, missing values, etc.). The metric data is then processed through a neural network at 626. This results in a derived score 628 that effectively weights the metrics produced by the MATHOR process 600. The weightings may be used to influence or decide which features within the synthetic dataset are more impactful. Higher weighted features will correspondingly result in their datasets being weighted higher (e.g., by the Learned Oracle for Dataset Selection module 404). In certain example embodiments, the metrics generated from the MATHOR process are processed through a neural network to determine or otherwise generate a score for how similar each of the synthetic datasets are with respect to the reference dataset. Thus, a dataset similarity score may be generated through processing the metrics through a neural network.

Consider an example where a synthetic dataset has features x, y, and z. The MATHOR process 600 will obtain metrics for that synthetic dataset (e.g. how similar it is to a reference dataset) and how the individual features perform within that synthetic dataset. The metrics from MATHOR are then feed into the neural network at 626 that may produce weightings for the features x, y, z. This may result in, for example, x being weighted twice as much as Y and 50 percent more than Z. More specifically, the results (e.g., derived score 628) of the neural network processing at 626 may prioritize the metrics that are obtained by MATHOR and thus, by inference, the features associated therewith. In other words, the neural network processing may result in obtaining information on which metrics are important and those that are not.

Turning to FIG. 9, the derived score 628 is provided to another machine learning process in the form of the Learned Oracle for Dataset Selection module 404. Here, the input data generator 902 collects all of the derived metrics 628 for each of the synthetic datasets 304. Thus, if there are 10 different synthetic datasets that are initially generated (e.g., from 302), then there may be 10 different derived scores/metrics 628. Those plural scores for the various synthetic datasets are collected by the input data generator 902. That collection of data is then passed to data preprocessing 904 that performs data clean up on the data to make sure it is ready for the neural network at 906 (e.g., removing NaNs, handling nulls, zeros, etc.). The neural network 906 is then run with all of the weighted metric data from each of the synthetic datasets to produce the final synthesized dataset 304. This includes weighting the individual synthetic datasets (based on the metrics associated with those datasets) and then blending the plural synthetic datasets into the final dataset 308 that is produced by the neural network 906. Accordingly, the neural network 906 is programmed to produce an optimal (e.g., within a defined error threshold) selection from each of the various synthetic datasets to produce dataset 308.

In certain example embodiments, the architecture of the model (the reference model) that is associated with the reference dataset is used for neural network 906. More specifically, the weights associated with the reference model are stripped out and the architecture of the reference model is then trained by using the data of the respective synthetic datasets. This training will then produce weights for the corresponding instance of the neural network 906. The generated weights may then be compared to the weights of the reference model to thereby generate a training similarity score. The training similarity score and the dataset similarity scores may then be used to produce a synthesized dataset from the initially generated synthetic datasets.

Description of FIG. 10A—Model Evaluator

FIG. 10A is a block diagram of the Model Evaluator 200 of FIG. 2 according to certain example embodiments. The model evaluator 200 is used to compare the performance of the models in the model database 202 by using the finalized synthesized dataset 308 based on metrics provided by the user to make determinations for one or more of the following items: 1) make a decision on retraining; 2) make a decision for the base model on retraining; 3) rank performance of the models; and/or 4) determine which model (either existing or newly generated) is to be associated with the synthesized dataset 308.

When the model evaluator 200 is evaluating model(s) it will create a test dataset 1002. This is used as a holdout dataset for testing the performance of models. In certain example embodiments, the test dataset 1002 corresponds to the reference dataset that was used during the MATHOR process 600. This test dataset may serve as a point of comparison to see how the synthesized dataset 308 performs.

Model manager 1010 is configured to supply a model to the predictor 1006. The model that is selected by the model manager 1010 may be the model that is already associated with the reference dataset 1002 (e.g., as noted above, each reference dataset may be associated with a corresponding model). In certain examples, the model that is supplied to the predictor 1006 may be selected based on the nature of the final synthesized dataset.

The predictor 1006 will then run both the synthesized dataset 308 (e.g., generated from the Synthesized Retraining Dataset Generator 210) and the reference dataset 1002 through the supplied model to generate predictions (e.g., whether a Labrador is in a photo, whether spoofing is found or not found, etc.) for both of the datasets.

The predictor 1006 will then generate metrics (e.g., a confusion matrix, f-score, precision, recall, and the like) that quantifies how well the model performed at classifying the reference dataset 1002. For example, a confusion matrix may be used to describe the performance of the model. The output from the predictor 1006 may include metrics on the performance of the model and the two datasets that are run against that model. This output is then supplied to the comparator 1008.

The comparator 1008 takes the performance metrics from the predictor 1006 as an input and judges the model's performance based on evaluation metrics 1004 that are provided by the user. Evaluation metrics may be those metrics that the user (or perhaps another automated process) deem to be significant or the like for performance of the synthesized dataset. If the performance of the finalized synthesized dataset 308 against the model is within a provided threshold amount, then the model (which is already associated with the reference dataset 1002) may be deemed suitable for handling the task that is desired (e.g., judging spoofing instances or identifying Labradors, etc.)

Based on the results of the comparator 1008, the model manager will select a model and link that model to the synthesized dataset 308 that is now one of the plural datasets that is part of the retraining database 212. The model used by the predictor 1006 will be selected if deemed to have performed well enough (e.g., based on the evaluation metrics 1004 provided by a user and processing by the comparator 1008). On the other hand, if the model is deemed not to have performed well enough, then that model and the synthesized dataset 308 will be passed to trainer 214 that will generate a new model (e.g. by training a model by using the synthesized dataset 308). Once the new model is trained it is stored into the model database 202 and will also be linked to the synthesized dataset 308 that is stored in the retraining database 212. Thus, the synthesized dataset will become a new reference dataset that can be used in the future with an associated model (which may or may not have been newly generated).

Description of FIG. 10B: Example Implementation

The following is an example use case of the transfer learning techniques discussed herein. This example relates to assessing market manipulation that is being performed in electronic trading platforms (e.g., futures markets, equities markets, bond markets, etc.). FIG. 10B is a block diagram of an example implementation for how the system of FIG. 2 may be employed to detect different types of market manipulations according to certain example embodiments.

With modern market places, market manipulations or fraudulent activity can be difficult to detect. Such activity includes insider trading and other fraud and trading manipulations. Such manipulations can include manipulation in prices and volume by trading, order book manipulation, price movements, and clearly erroneous transactions, and others. Part of the difficult in spotting certain types of fraudulent activity relates to both the speed at which the electronic market (e.g., the NASDAQ stock exchange) places operate (e.g., faster than a human can realistically process) and the amount of data that they process on a daily basis (e.g., millions or billions of transactions with tens, hundreds, or even thousands of different parameters and values each).

An issue with employing models to detect such activity is that there are many different types of manipulations and many different types of markets (or sub-markets). The difficulty of these problems can be even more complex due to the nature of the data processed by the markets. The data that is used can be unlabeled, there may be unique features for different problems to address, etc. Developing models given all of these factors can take a vast amount of resources. Accordingly, the techniques herein allow for using artificial Intelligence and/or machine learning to decrease, for example, model development time by transferring the knowledge between, for example, markets and/or events, and allowing for the models to be continually enhanced (e.g., the detection quality) by using the analyst feedback in a machine learning process.

Turning to FIG. 10B, systems 1050 (collectively systems 1050A, 1050B, 1050C, and 1050D) are example detection systems that may be, for example, model retraining system 108 and/or computer system 100. Each of systems 1050 may be the same computing instance (e.g., computing device 1100) or may be different instances (e.g., separate computing devices 1100). Systems 1050 are supplied with different types of data depending on the needs of a given problem or task. Also supplied to each of the systems is a model that is to be used in classifying the data that is handled by the system or is otherwise (potentially) relevant to the problem or task to be addressed.

In FIG. 10B, an initial spoofing model 1054 is supplied along with generic market data 1052 to system 1050A. The data and the model are passed to the surveillance system 1056 (which may be the model serving component 204 and dataset extractor 205) that will perform an initial classification and produce detected events 1058 (e.g., detection frames) based on applying the data 1052 to the model 1054. The detected events are passed to an analyst at 1060. The analyst then validates and/or labels the detected events (e.g., as discussed in connection with frame validation and labeling module 206). Based on this labeling a new model is then produced at 1062. This may be, for example, the result of the processing performed by the Synthesized Retraining Dataset Generator 210 and the model evaluator 200 (which may train a new model based on the initially supplied model 1054). System 1050A may continue to loop and update the model 1054 as new data is applied and new labels/validations are performed by the analyst 1060.

At some point one or more new tasks may be desired that relates to, in this example, U.S. equities market data 1066 and/or US options market data 1074. At this point the knowledge that is contained in the model 1054 (or its updated version) and/or datasets associated therewith may undergo a transfer learning 1064 process. Specifically, the spoofing model 1068 (e.g. a spoofing model that is based on spoofing model 1054) may be used to classify U.S. equities market data 1066 by system 1050B. Similarly, spoofing model 1072 (e.g. a version derived from model 1054) may be used to classify U.S. options market data 1074 using system 1050C. The process of classifying the new type of data may result in the weights of the model(s) being fine-tuned to specifically address the data from the more specific data sources. Accordingly, the pre-trained model (from model 1054) may be used with new market data, which may then lead to the fine tuning of model 1054 to thereby produce new models (e.g., model 1072) that are better able to spot spoofing that may be present in those new types of markets.

Just as new types of data may be used (e.g., options data vs equity market data), so to can new models be developed for the same or different market data to address other types of market manipulations or fraudulent activity. For example, once spoofing model 1068 is developed specifically for U.S. equities to handle spoofing in the U.S. equities market, then transfer learning may be used to develop a new model for a new, but potentially related type of market manipulations or fraudulent activity.

For example, a model 1070 that is used to detect so-called pump and dump manipulations may be generated. This model may initially be the same as the spoofing model 1068. However, after processing by system 1050D using the equities market data 1066, the labeling and validation performed by the analyst for that system will assist in retraining a new model that handles identifying of pump and dump scenarios.

Accordingly, the techniques herein may allow for machine learning to be used to develop models to detect market manipulations and other types of fraudulent activity that may occur in electronic trading platforms. Developing new models does not require starting from a generic model. Instead, existing models and the knowledge in those models (along with reference datasets that are associated therewith) can be used to develop yet further models to address new tasks. The new tasks may include new problems with the same data source, new data sources for the same problem, or new data sources with new problems.

Description of FIG. 11

FIG. 11 is a block diagram of an example computing device 1100 (which may also be referred to, for example, as a "computing device," "computer system," or "computing system") according to some embodiments. In some embodiments, the computing device 1100 includes one or more of the following: one or more processors 1102; one or more memory devices 1104; one or more network interface devices 1106; one or more display interfaces 1108; and one or more user input adapters 1110. Additionally, in some embodiments, the computing device 1100 is connected to or includes a display device 1112. As will explained below, these elements (e.g., the processors 1102, memory devices 1104, network interface devices 1106, display interfaces 1108, user input adapters 1110, display device 1112) are hardware devices (for example, electronic circuits or combinations of circuits) that are configured to perform various different functions for the computing device 1100.

In some embodiments, each or any of the processors 1102 is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). Processors 1102 are an example of a hardware processor. In some embodiments, each or any of the processors 1102 uses an instruction set architecture such as x86 or Advanced RISC Machine (ARM). In certain instances, each, any, or all of the processors 1102 within a computing device may be referred to as (e.g., collectively) a processing system. In certain examples, processing systems may span multiple computing devices (e.g., as a distributed processing system).

In some embodiments, each or any of the memory devices 1104 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 1102). Memory devices 1104 are examples of non-transitory computer-readable storage.

In some embodiments, each or any of the network interface devices 1106 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception of wireless or wired signals. In some embodiments, the transmitter and receiver of a transceiver may not share any common circuitry and/or may be in the same or separate housings.

In some embodiments, each or any of the display interfaces 1108 is or includes one or more circuits that receive data from the processors 1102, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 1112, which displays the image data. Alternatively or additionally, in some embodiments, each or any of the display interfaces 1108 is or includes, for example, a video card, video adapter, or graphics processing unit (GPU).

In some embodiments, each or any of the user input adapters 1110 is or includes one or more circuits that receive and process user input data from one or more user input devices (not shown in FIG. 11) that are included in, attached to, or otherwise in communication with the computing device 1100, and that output data based on the received input data to the processors 1102. Alternatively or additionally, in some embodiments each or any of the user input adapters 1110 is or includes, for example, a PS/2 interface, a USB interface, a touchscreen controller, or the like; and/or the user input adapters 1110 facilitates input from user input devices (not shown in FIG. 11) such as, for example, a keyboard, mouse, trackpad, touchscreen, etc.

In some embodiments, the display device 1112 may be a Liquid Crystal Display (LCD) display, Light Emitting Diode (LED) display, or other type of display device. In embodiments where the display device 1112 is a component of the computing device 1100 (e.g., the computing device and the display device are included in a unified housing), the display device 1112 may be a touchscreen display or non-touchscreen display. In embodiments where the display device 1112 is connected to the computing device 1100 (e.g., is external to the computing device 1100 and communicates with the computing device 1100 via a wire and/or via wireless communication technology), the display device 1112 is, for example, an external monitor, projector, television, display screen, etc.

In various embodiments, the computing device 1100 includes one, or two, or three, four, or more of each or any of the above-mentioned elements (e.g., the processors 1102, memory devices 1104, network interface devices 1106, display interfaces 1108, and user input adapters 1110). Alternatively or additionally, in some embodiments, the computing device 1100 includes one or more of: a processing system that includes the processors 1102; a memory or storage system that includes the memory devices 1104; and a network interface system that includes the network interface devices 1106.

The computing device 1100 may be arranged, in various embodiments, in many different ways. As just one example, the computing device 1100 may be arranged such that the processors 1102 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 1100 may be arranged such that: the processors 1102 include two, three, four, five, or more multi-core processors; the network interface devices 1106 include a first network interface device that implements Ethernet and a second network interface device that implements WiFi and/or Bluetooth; and the memory devices 1104 include a RAM and a flash memory or hard disk.

As previously noted, whenever it is described in this document that a software module, software process, or other software element performs any action, the action is in actuality performed by underlying hardware elements according to the instructions that comprise the software module. Consistent with the foregoing, in various embodiments, each or any combination of the model retraining system 108, database 102, model evaluator 200, model serving 204, dataset extractor 205, frame validation and labeling 206, detection frames storage 208, synthesized retraining dataset generator 210, retraining dataset storage 212, trainer 214, model database 202, dataset generation methodologies module, learned oracle with MATHOR module 306, learned MATHOR module 402, learned oracle for dataset selection 404, dataset extractor 406, predictor 1006, comparator 1008, and model manager 1010, each of which will be referred to individually for clarity as a "component" for the remainder of this paragraph, are implemented using an example of the computing device 1100 of FIG. 5. In such embodiments, the following applies for each component: (a) the elements of the 1100 computing device 1100 shown in FIG. 11 (i.e., the one or more processors 1102, one or more memory devices 1104, one or more network interface devices 1106, one or more display interfaces 1108, and one or more user input adapters 1110), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules and the like) are stored in the memory devices 1104 (e.g., in various embodiments, in a volatile memory device such as a RAM or an instruction register and/or in a non-volatile memory device such as a flash memory or hard disk) and all actions described herein as performed by the software modules are performed by the processors 1102 in conjunction with, as appropriate, the other elements in and/or connected to the computing device 1100 (i.e., the network interface devices 1106, display interfaces 1108, user input adapters 1110, and/or display device 1112); (c) alternatively or additionally, to the extent it is described herein that the component processes and/or otherwise handles data, in some embodiments, such data is stored in the memory devices 1104 (e.g., in some embodiments, in a volatile memory device such as a RAM and/or in a non-volatile memory device such as a flash memory or hard disk) and/or is processed/handled by the processors 1102 in conjunction, as appropriate, the other elements in and/or connected to the computing device 1100 (i.e., the network interface devices 1106, display interfaces 1108, user input adapters 1110, and/or display device 512); (d) alternatively or additionally, in some embodiments, the memory devices 1102 store instructions that, when executed by the processors 1102, cause the processors 1102 to perform, in conjunction with, as appropriate, the other elements in and/or connected to the computing device 1100 (i.e., the memory devices 1104, network interface devices 1106, display interfaces 1108, user input adapters 1110, and/or display device 512), each or any combination of actions described herein as performed by the component and/or by any software modules described herein as included within the component.

Consistent with the preceding paragraph, as one example, in an embodiment where an instance of the computing device 1100 is used to implement the model retraining system 108, the memory devices 1104 could store detection frames in detection frames storage 208 and models may be stored in model database 202, and/or store the data described herein as processed and/or otherwise handled by the synthesized retraining dataset generator 210 and/or model evaluator 200. Processors 1102 could be used to operate the synthesized retraining dataset generator (and the components and processing described therein) to generate a synthesized dataset, the model evaluator 200 (and the components and processing described therein) to select or train models from a synthesized dataset, the model serving module 204 to run predictions on a model with a dataset provided by the dataset extractor 205, etc.

The hardware configurations shown in FIG. 11 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 11, (e) via other hardware arrangements, architectures, and configurations, and/or via combinations of the technology described in (a) through (e).

Technical Advantages of Described Subject Matter

Certain example embodiments allow for generating datasets that may be used for retraining (or training) a model in a more resource efficient manner.

In certain example embodiments, techniques for determining how similar two datasets are to one another with respect to a model are provided (e.g., via the MATHOR process discussed above). Such techniques can be used to generate (e.g., more efficiently) datasets that are used to select and/or retrain models. As an example, a standard approach to training a model may require 2500 detected frames with 20 or so positive frames. The techniques herein may be able to operate with around 75 detected frames and 25 or so positive frames. Accordingly, the amount of data that is needed for retraining purposes can be decreased. For example, by at least 25%, or even 50% or more. Such techniques may be beneficial for when there are relatively few occurrences within a dataset.

In certain example embodiments, techniques for developing models that assist in identifying market manipulations are provided. For example, techniques that assist in identifying market participants that participate in spoofing activities. The techniques may allow the transfer of knowledge that is related to a first data set (e.g., the commodities market) to a second dataset (e.g., the equities market).

In certain example embodiments, the techniques herein may be applied to language translation models that assist in developing language translation models in a more resource efficient manner. For example, translation models for English to Spanish may be used to generate or develop a model that translates from English to Portuguese. For example, there may be fewer books that have translations in English and Portuguese and thus developing/training a translation model for English-Portuguese model may be more difficult than a English to Spanish model (which may have more books). Moreover, generating an English and Portuguese may be a resource intensive task. The techniques herein may be used to assist in selecting the Portuguese books (or which portions of those books) that would assist in developing the English to Portuguese model by using the English to Spanish translation model as a starting point.

The technical features described herein may thus improve the verifiability, reliability, speed, and other technical aspects that are related to machine learning and developing models by using machine learning.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like, including without limitation with reference to FIGS. 1-10, may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
non-transitory computer readable memory that is configured to store:
  a reference model; and
  a reference dataset that is associated with the reference model;
a processing system that includes at least one hardware processor, the processing system configured to:
  generate a plurality of synthetic datasets that are derived from labeled detection frames;
  generate, for each synthetic dataset of the plurality of synthetic datasets, a plurality of feature metrics for a plurality of features from the each synthetic dataset, wherein the feature metrics are generated based on the reference dataset;
  use a first neural network to generate, based on the determined plurality of feature metrics, a dataset similarity score for each of the plurality of synthetic datasets with respect to the reference dataset, wherein each of the dataset similarity scores indicates how similar a given synthetic dataset is to the reference dataset;
  generate, for each of the plurality of synthetic datasets, a training similarity score by training a neural network architecture of the reference model by using a corresponding synthetic dataset; and generate a synthesized dataset by combining data from the plurality of synthetic datasets based on the training similarity scores and the dataset similarity scores.

2. The system of claim 1, wherein the processing system is further configured to:
select features from each of the plurality synthetic datasets that have separability that is greater than a threshold amount,
wherein the plurality of feature metrics for each of the plurality synthetic datasets are generated based on those features that are selected.

3. The system of claim 1, wherein the processing system is further configured to:
perform a feature level similarly process between each of the plurality synthetic datasets and the reference dataset,
wherein the plurality of feature metrics for each of the plurality synthetic datasets are generated based on the performed feature level similarly process.

4. The system of claim 3, wherein the processing system is further configured to:
calculate a density estimate curve, with respect to the reference dataset, for each feature for each of the plurality synthetic datasets,
wherein the plurality of feature metrics for each of the plurality synthetic datasets are generated the calculated density estimate curves for the features in the plurality synthetic datasets.

5. The system of claim 4, wherein the processing system is further configured to:
calculate, for each feature of each of the plurality synthetic datasets, a geometric similarity based on a corresponding calculated density estimate curve.

6. The system of claim 1, wherein the processing system is further configured to:
perform a sample-level similarity check that includes a homogeneity check and a heterogeneity check, the homogeneity check measuring how similar the same classes are between the reference dataset and one of the plurality of synthetic datasets, the heterogeneity check measuring how dissimilar different classes are within the same synthetic dataset,
wherein the plurality of feature metrics for each of the plurality synthetic datasets are generated the calculated density estimate curves for the features in the plurality synthetic datasets.

7. The system of claim 1, wherein the processing system is further configured to:
perform a Model-Agnostic Tensor Homogeneity evaluator process to calculate the plurality of feature metrics.

8. The system of claim 1, wherein the processing system is further configured to:
test performance of the synthesized dataset against the reference model; and
based on determination that the tested performance of the synthesized dataset is within a threshold amount, store an association between the synthesized dataset and the reference model.

9. The system of claim 8, wherein the processing system is further configured to:
based on the determination that the tested performance of the synthesized dataset is outside the threshold amount, train a new model by using the synthesized dataset; and
store an association between the synthesized dataset and the new model.

10. A method implemented on a computer system, the method comprising:
storing, to a non-transitory storage medium, a reference model and a reference dataset that is associated with the reference model;
generating a plurality of synthetic datasets that are derived from labeled detection frames;
generating, for each synthetic dataset of the plurality of synthetic datasets, a plurality of feature metrics for a plurality of features from the synthetic dataset, wherein the feature metrics are generated based on comparison to the reference dataset;
using a first neural network to generate, based on the determined plurality of feature metrics, a dataset similarity score for each of the plurality of synthetic datasets with respect to the reference dataset, wherein each of the dataset similarity scores indicates how similar a given synthetic dataset is to the reference dataset;
generating, for each of the plurality of synthetic datasets, a training similarity score by training a neural network architecture of the reference model by using a corresponding synthetic dataset; and
constructing a synthesized dataset by combining data from the plurality of synthetic datasets based on the training similarity scores and the dataset similarity scores.

11. The method of claim 10, further comprising:
selecting features from each of the plurality synthetic datasets that have separability that is greater than a threshold amount,
wherein the plurality of feature metrics for each of the plurality synthetic datasets are generated based on those features that are selected.

12. The method of claim 10, further comprising:
performing a feature level similarly process between each of the plurality synthetic datasets and the reference dataset,
wherein the plurality of feature metrics for each of the plurality synthetic datasets are generated based on the performed feature level similarly process.

13. The method of claim 10, further comprising:
calculating a density estimate curve, with respect to the reference dataset, for each feature for each of the plurality synthetic datasets,
wherein the plurality of feature metrics for each of the plurality synthetic datasets are generated the calculated density estimate curves for the features in the plurality synthetic datasets.

14. The method of claim 10, further comprising:
calculating, for each feature of each of the plurality synthetic datasets, a geometric similarity based on a corresponding calculated density estimate curve.

15. The method of claim 10, further comprising:
performing a sample-level similarity check that includes a homogeneity check and a heterogeneity check, the homogeneity check measuring how similar the same classes are between the reference dataset and one of the plurality of synthetic datasets, the heterogeneity check measuring how dissimilar different classes are within the same synthetic dataset,
wherein the plurality of feature metrics for each of the plurality synthetic datasets are generated the calculated density estimate curves for the features in the plurality synthetic datasets.

16. The method of claim 10, further comprising:
performing a Model-Agnostic Tensor Homogeneity Evaluator process to calculate the plurality of feature metrics.

17. The method of claim 10, further comprising:
testing performance of the synthesized dataset against the reference model; and
based on determination that the tested performance of the synthesized dataset is within a threshold amount, storing an association between the synthesized dataset and the reference model.

18. The method of claim 10, further comprising:
based on the determination that the tested performance of the synthesized dataset is outside the threshold amount, training a new model by using the synthesized dataset; and
storing an association between the synthesized dataset and the new model.

19. A non-transitory computer readable storage medium configured to store computer-executable instructions for use with a computer system, the stored computer-executable instructions comprising instructions that cause the computer system to perform operations comprising:
storing, to a non-transitory storage medium, a reference model and a reference dataset that is associated with the reference model;
generating a plurality of synthetic datasets that are derived from labeled detection frames;
generating, for each synthetic dataset of the plurality of synthetic datasets, a plurality of feature metrics for a plurality of features from the synthetic dataset, wherein the feature metrics are generated based on comparison to the reference dataset;
using a first neural network to generate, based on the determined plurality of feature metrics, a dataset similarity score for each of the plurality of synthetic datasets with respect to the reference dataset, wherein each of the dataset similarity scores indicates how similar a given synthetic dataset is to the reference dataset;
generating, for each of the plurality of synthetic datasets, a training similarity score by training a neural network architecture of the reference model by using a corresponding synthetic dataset; and
constructing a synthesized dataset by combining data from the plurality of synthetic datasets based on the training similarity scores and the dataset similarity scores.

20. The non-transitory computer readable storage medium of claim 19, wherein the operations further comprise:
selecting features from each of the plurality synthetic datasets that have separability that is greater than a threshold amount,
wherein the plurality of feature metrics for each of the plurality synthetic datasets are generated based on those features that are selected.

* * * * *